United States Patent
Song et al.

(10) Patent No.: US 9,660,268 B2
(45) Date of Patent: *May 23, 2017

(54) ALKALI-ION BATTERY WITH ENHANCED TRANSITION METAL CYANOMETALLATE ELECTRODE STRUCTURE

(71) Applicant: Sharp Laboratories of America, Inc., Camas, WA (US)

(72) Inventors: Jie Song, Vancouver, WA (US); Yuhao Lu, Camas, WA (US); Xin Zhao, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/928,559

(22) Filed: Oct. 30, 2015

(65) Prior Publication Data

US 2016/0056467 A1 Feb. 25, 2016

Related U.S. Application Data

(63) Continuation-in-part of application No. 14/827,001, filed on Aug. 14, 2015, now Pat. No. 9,455,446, and
(Continued)

(51) Int. Cl.
*H01M 4/00* (2006.01)
*H01M 4/58* (2010.01)
(Continued)

(52) U.S. Cl.
CPC ............ *H01M 4/5825* (2013.01); *C01C 3/11* (2013.01); *H01M 2/162* (2013.01);
(Continued)

(58) Field of Classification Search
CPC ....... H01M 4/5825; H01M 2300/0017; H01M 2/162; H01M 10/0525; H01M 10/054; H01M 4/583; H01M 4/387
See application file for complete search history.

(56) References Cited

U.S. PATENT DOCUMENTS

2008/0153006 A1* 6/2008 Oh .................... H01M 10/0525
429/332
2012/0328936 A1* 12/2012 Wessells ............. H01M 10/054
429/188

OTHER PUBLICATIONS

Towards Ultrathick Battery Electrodes: Aligned Carbon Nanotube—Enabled Architecture, Advanced Materials, 2011.
(Continued)

*Primary Examiner* — Mark F Huff
*Assistant Examiner* — Monique Wills
(74) *Attorney, Agent, or Firm* — Law Office of Gerald Maliszewski; Gerald Meliszewski

(57) ABSTRACT

An alkali-ion battery is provided with a transition metal cyanometallate (TMCM) sheet cathode and a non-alkaline metal anode. The fabrication method mixes TMCM powders, conductive additives, and a polytetrafluoroethylene binder with a solution containing water, forming a wet paste. The wet paste is formed into a free-standing sheet of cathode active material, which is laminated to a cathode current collector, forming a cathode electrode. The free-standing sheet of cathode active material has a thickness typically in the range of 100 microns to 2 millimeters. The cathode electrode is assembled with a non-alkaline metal anode electrode and an ion-permeable membrane interposed between the cathode electrode and anode electrode, forming an assembly. The assembly is dried at a temperature of greater than 100 degrees C. The dried assembly is then inserted into a container (case) and electrolyte is added. Thick anodes made from free-standing sheets of active material can be similarly formed.

18 Claims, 3 Drawing Sheets

Related U.S. Application Data a continuation-in-part of application No. 14/830,838, filed on Aug. 20, 2015, now Pat. No. 9,478,798, which is a continuation-in-part of application No. 14/795,834, filed on Jul. 9, 2015, now Pat. No. 9,431,655, which is a continuation-in-part of application No. 14/668,788, filed on Mar. 25, 2015, now Pat. No. 9,531,002, which is a continuation-in-part of application No. 14/472,228, filed on Aug. 28, 2014, now Pat. No. 9,546,097, which is a continuation-in-part of application No. 14/340,141, filed on Jul. 24, 2014, which is a continuation-in-part of application No. 14/320,352, filed on Jun. 30, 2014, now Pat. No. 9,620,815, which is a continuation-in-part of application No. 14/271,498, filed on May 7, 2014, now Pat. No. 9,419,278, which is a continuation-in-part of application No. 14/230,882, filed on Mar. 31, 2014, now Pat. No. 9,634,317, which is a continuation-in-part of application No. 14/198,755, filed on Mar. 6, 2014, which is a continuation-in-part of application No. 14/198,702, filed on Mar. 6, 2014, now Pat. No. 9,583,751, which is a continuation-in-part of application No. 14/198,663, filed on Mar. 6, 2014, now Pat. No. 9,537,131, which is a continuation-in-part of application No. 14/193,782, filed on Feb. 28, 2014, now Pat. No. 9,627,671, which is a continuation-in-part of application No. 14/193,501, filed on Feb. 28, 2014, now Pat. No. 9,406,919, which is a continuation-in-part of application No. 14/174,171, filed on Feb. 6, 2014, now Pat. No. 9,455,431, which is a continuation-in-part of application No. 14/067,038, filed on Oct. 30, 2013, now Pat. No. 9,450,224, which is a continuation-in-part of application No. 14/059,599, filed on Oct. 22, 2013, now Pat. No. 9,083,041, which is a continuation-in-part of application No. 13/907,892, filed on Jun. 1, 2013, now Pat. No. 8,968,925, which is a continuation-in-part of application No. 13/897,492, filed on May 20, 2013, now Pat. No. 9,099,719, which is a continuation-in-part of application No. 13/872,673, filed on Apr. 29, 2013, now Pat. No. 9,246,164, which is a continuation-in-part of application No. 13/752,930, filed on Jan. 29, 2013, now Pat. No. 9,099,718, which is a continuation-in-part of application No. 13/603,322, filed on Sep. 4, 2012, now Pat. No. 9,159,502, and a continuation-in-part of application No. 13/523,694, filed on Jun. 14, 2012, now Pat. No. 8,956,760, which is a continuation-in-part of application No. 13/449,195, filed on Apr. 17, 2012, now Pat. No. 9,559,358, which is a continuation-in-part of application No. 13/432,993, filed on Mar. 28, 2012, now Pat. No. 9,269,953.

(51) Int. Cl.
| | | |
|---|---|---|
| H01M 4/62 | (2006.01) | |
| H01M 2/16 | (2006.01) | |
| H01M 10/054 | (2010.01) | |
| H01M 4/38 | (2006.01) | |
| H01M 4/56 | (2006.01) | |
| H01M 4/136 | (2010.01) | |
| H01M 4/1397 | (2010.01) | |
| H01M 10/0585 | (2010.01) | |
| C01C 3/11 | (2006.01) | |

(52) U.S. Cl.
CPC ....... *H01M 2/1626* (2013.01); *H01M 2/1646* (2013.01); *H01M 4/136* (2013.01); *H01M 4/1397* (2013.01); *H01M 4/381* (2013.01); *H01M 4/387* (2013.01); *H01M 4/56* (2013.01); *H01M 4/622* (2013.01); *H01M 4/623* (2013.01); *H01M 10/054* (2013.01); *H01M 10/0585* (2013.01)

(56) References Cited

OTHER PUBLICATIONS

G.Yang, K.Song and S. Joo, "Ultra-thick Li-ion battery electrodes using different cell size of metal foam current collectors" RSC Adv., 2015, 5, 16702.

Singh, M., et al., "Thick Electrodes for High Energy Lithium Ion Batteries, J. Electrochem. Soc.", 162 (7) A1196-A1201 (2015).

V.D. Neff, Some performance characteristics of a Prussian Blue battery, Journal of Electrochemical Society, 132 (1985) 1382-1384.

N. Imanishi, et al., Lithium intercalation behavior into iron cyanide complex as positive electrode of lithium secondary battery, Journal of Power Sources, 79 (1999) 215-21.

Y. Lu, L. Wang, J. Cheng, J.B. Goodenough, Prussian blue: a new framework for sodium batteries, Chemistry Communication, 48(2012)6544-6546.

L. Wang, Y. Lu, J. Liu, M. Xu, J. Cheng, D. Zhang, J.B. Goodenough, A superior low-cost cathode for a Na-ion battery, Angew. Chem. Int. Ed., 52(2013)1964-1967.

A. Eftekhari, Potassium secondary cell based on Prussian blue cathode, J. Power Sources, 126 (2004) 221-228.

M.Singh, et al, Ultra-thick Li-ion battery electrodes using different cell size of metal foam current collectors, J. Electrochemical Society, 162 (7) A1196-A1201 (2015).

R.Zhao, J. Liu, J. Gu. The effects of electrode thickness on the electrochemical and thermal characteristics of lithium ion battery Applied Energy 139 (2015) 220-229.

Tran, Binh et al., Thick LiCoO2/Nickel Foam Cathode Prepared by an Adhesive and Water-Soluable PEG-Based Copolymer Binder, J of ECS, 159 (12) A1928-A1933 (2012).

\* cited by examiner

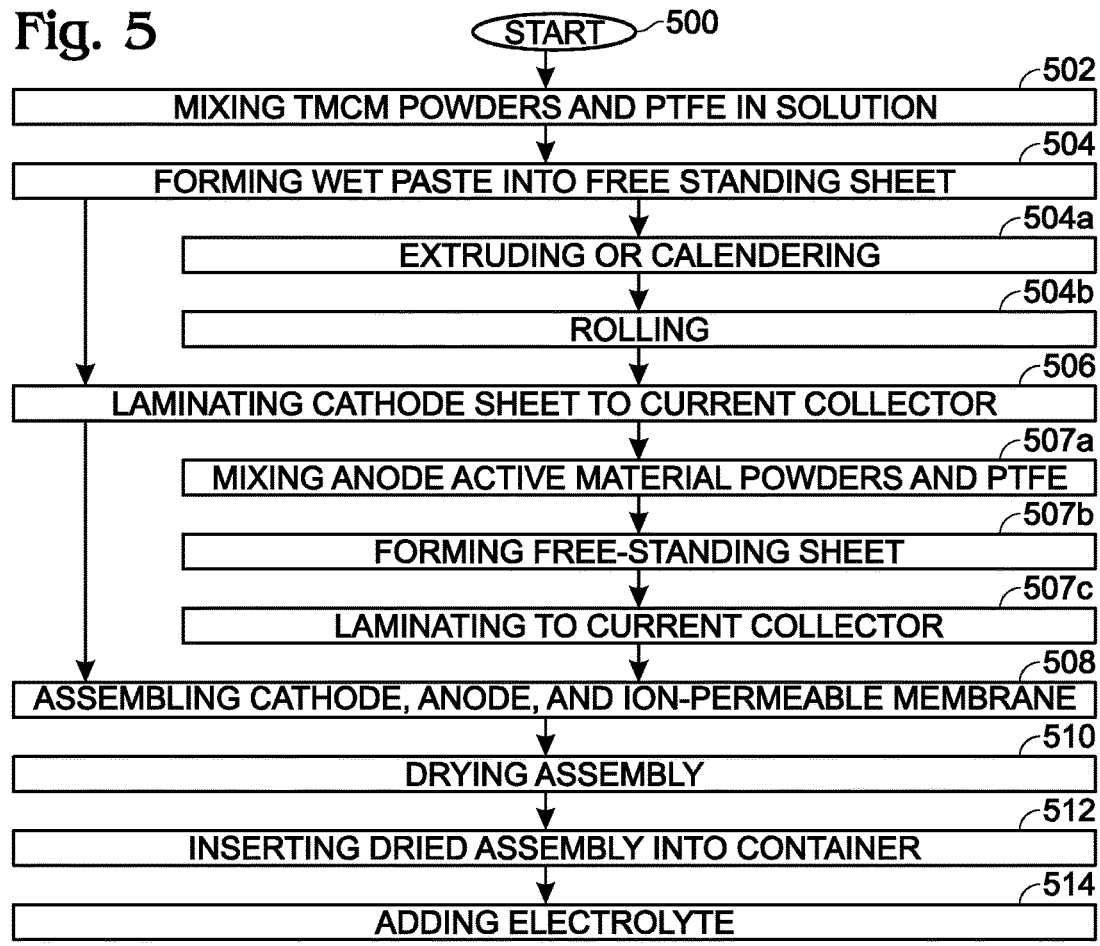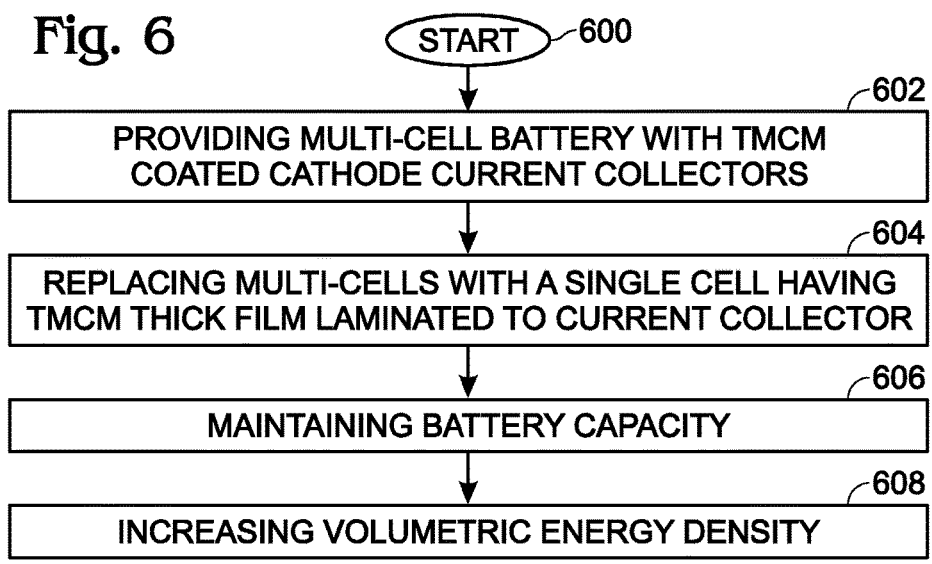

ALKALI-ION BATTERY WITH ENHANCED TRANSITION METAL CYANOMETALLATE ELECTRODE STRUCTURE

This invention was made with Government support under DE-AR0000297 awarded by DOE. The Government has certain rights in this invention.

BACKGROUND OF THE INVENTION

1. Field of the Invention

This invention generally relates to an electrochemical battery and, more particularly, to an alkali-ion battery using a cathode formed from a thick transition metal cyanometallate (TMCM) sheet.

2. Description of the Related Art

The demand continues to emerge for an economic means of storing the energy generated from renewable, but intermittent, solar and wind power sources. This energy transformational technology is expected to enable the large scale integration of renewable energy and to dramatically increase power generation and transmission efficiency. Rechargeable room-temperature batteries have several advantages for this application, including scale flexibility, economic maintenance, and energy-storage efficiency, as compared to other energy-storage technologies such as fly wheels, pumped water, compressed air, and high-temperature sodium/sulfur batteries. Although lithium-ion batteries are a well-developed successful product, the high demand for lithium and its limited reserves have led to a surge in its cost, which hinders the application of lithium-ion batteries on a large scale. Therefore, a low-cost rechargeable battery is urgently needed as an alternative to expensive lithium-ion batteries.

Sodium/potassium-ion batteries have recently received a great deal of attention because the reserves of sodium/potassium in the crust of the earth are much higher than lithium. This abundance makes possible the development of low cost batteries for electrical energy storage (EES). However, it has proved impractical to copy the structures of $Li^+$-host compounds to $Na^+$ or $K^+$-host compounds. Sodium/potassium ions are much larger than lithium ions and they severely distort the structures of the $Li^+$-host compounds. Thus, for the development of sodium/potassium-ion batteries it is important to develop new $Na^+/K^+$-host materials with large interstitial space in which sodium/potassium-ions can easily and reversibly move. Transition metal cyanometallate (TMCM) materials with large interstitial space have been investigated as cathode materials for rechargeable lithium-ion batteries [1, 2], sodium-ion batteries [3, 4], and potassium-ion batteries [5].

The most widely used method to make an electrode for lithium ion batteries, sodium ion batteries, and supercapacitors is a coating process. An organic solvent or an aqueous solution is used to dissolve a binder, and the binder solution is then mixed with an active material powder and conductive additives to form a slurry. The slurry is then coated on a current collector. The current collect with the coating layer is dried and calendared to a desired porosity and thickness. Generally, the thickness of the active material is around 50 to 100 microns (μm) for electrode made by coating method [6]. Delamination or cracks occur when the thickness of the coated electrode increases beyond this limit. The capacity of an electrode made from any given active material could be improved by increasing the electrode thickness [7].

It would be advantageous if the thicknesses of the TMCM active material formed on a cathode current collector could be increased.

It would be advantageous if the number of cells, and therefore overall size, of a TMCM cathode battery could be decreased, while maintaining the same capacity.

1] V. D. Neff. "Some performance characteristics of a Prussian Blue battery, Journal of Electrochemical Society", 132 (1985) 1382-1384.

[2] N. Imanishi, T. Morikawa, J. Kondo, Y. Takeda, O. Yamamoto, N. Kinugasa, T. Yamagishi, "Lithium intercalation behavior into iron cyanide complex as positive electrode of lithium secondary battery", Journal of Power Sources, 79 (1999) 215-219.

[3] Y. Lu, L. Wang, J. Cheng, J. B. Goodenough, "Prussian blue: a new framework for sodium batteries", Chemistry Communication, 48(2012)6544-6546.

[4] L. Wang, Y. Lu, J. Liu, M. Xu, J. Cheng, D. Zhang, J. B. Goodenough, "A superior low-cost cathode for a Na-ion battery", Angew. Chem. Int. Ed., 52(2013)1964-1967.

[5] A. Eftekhari, "Potassium secondary cell based on Prussian blue cathode", J. Power Sources, 126 (2004) 221-228

6] G. Yang, K. Song and S. Joo, "Ultra-thick Li-ion battery electrodes using different cell size of metal foam current collectors" RSC Adv., 2015, 5, 16702.

[7] R. Zhao, J. Liu, J. Gu, "The effects of electrode thickness on the electrochemical and thermal characteristics of lithium ion battery", Applied Energy 139 (2015) 220-229.

SUMMARY OF THE INVENTION

Disclosed herein is a method of producing alkali-ion batteries with thick transition metal cyanometallate (TMCM) electrodes, non-alkali metal anodes, and high melting temperature separators. The electrodes described herein can be made substantially thicker than the conventional electrodes made by coating method. As a result, the ratio of active materials to inactive materials in the thick electrode is much higher than in an electrochemical cell that include conventional (coated) electrodes. Comparing the thick electrodes to coated electrodes, a fewer number of cells is required, as the thicker layers of active material mean a reduced number of current collectors and separators (ion-permeable membranes), which also results in a shorter assembly time to create equivalent capacities. Fewer cells reduce the cost of the battery since fewer separators and current collectors are needed. The shorter assembly time also increases the throughput of industrialized automated cell production lines, which additionally saves investment costs for stacking or winding machines. The use of a high melting temperature separator enables the step of stacking or winding the electrodes with the separator to be done in normal atmosphere, and thus decreases the size of the dry room, along with its investment costs and operation expenses.

Accordingly, a method is for fabricating an alkali-ion battery with a TMCM sheet cathode and a non-alkaline metal anode. The method mixes TMCM powders, conductive additives, and a polytetrafluoroethylene (PTFE) binder with a solution containing water, forming a wet paste. The wet paste is formed into a free-standing sheet of cathode active material, which is laminated to a cathode current collector, forming a cathode electrode. The free-standing sheet of cathode active material has a thickness typically in the range of 100 microns to 2 millimeters (mm). The cathode electrode is assembled with a non-alkaline metal anode electrode and an ion-permeable membrane interposed between the cathode electrode and anode electrode, forming an assembly. The assembly is dried at a temperature of greater than 100 degrees C. The dried assembly is then inserted into a container (e.g., can) and electrolyte is added.

The wet paste is formed using a solution that may include a solvent such as ethanol, isopropanol, or acetone, with the percentage of solvent in the solution being in the range of 20 to 50%. The free-standing sheet of cathode active material uses a process such as extruding or calendering the wet paste, followed by a rolling press to obtain the desired thickness. The cathode electrode comprises a ratio of cathode active material to non-active materials of greater than 35%.

The anode electrode may also be made thick by mixing anode active material powder and a PTFE binder with a water solution, forming a wet paste. A free-standing anode active material sheet is then formed that is laminated to an anode current collector. The anode active material may, for example, be hard carbon, tin (Sn), antimony (Sb), lead (Pb), NASICON-sodium titanium phosphate ($NaTi_2(PO_4)_3$), SnSb alloys, or combinations thereof.

Additional details of the above-described method and an alkali-ion battery with a TMCM sheet cathode are provided below.

BRIEF DESCRIPTION OF THE DRAWINGS

FIG. 5 is a flowchart illustrating a method for fabricating an alkali-ion battery with a TMCM sheet cathode and a non-alkaline metal anode.

FIG. 6 is a flowchart illustrating a method for decreasing the size of an alkali-ion TMCM cathode battery.

DETAILED DESCRIPTION

Figure 1:
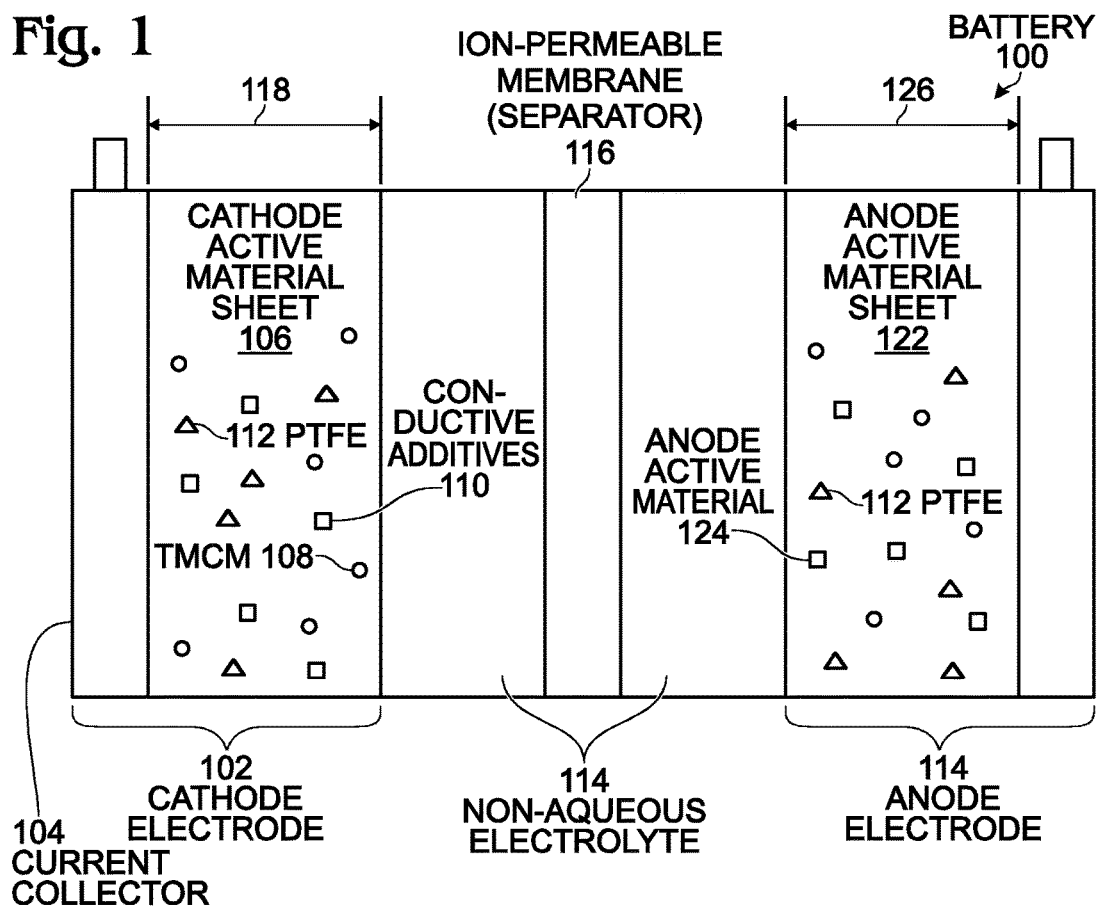
FIG. 1 is a partial cross-sectional view of an alkali-ion battery cell with a transition metal cyanometallate (TMCM) sheet cathode and non-alkaline metal anode.

The following parent applications are incorporated herein by reference:

PRUSSIAN BLUE ANALOGUE ELECTRODES WITHOUT ZEOLITIC WATER CONTENT, invented by Yuhao Lu et al., Ser. No. 14/830,838, filed Aug. 20, 2015, SODIUM AND POTASSIUM ION BATTERIES WITH HALOGEN SALTS, invented by Yuhao Lu et al., Ser. No. 14/827,001, filed Aug. 14, 2015, ANTIMONY AND LAYERED CARBON NETWORK BATTERY ANODE, invented by Xin Zhao et al, Ser. No. 14/795,834, filed Jul. 9, 2015, TRANSITION METAL CYANOMETALLATE CATHODE BATTERY WITH METAL PLATING ANODE, invented by Yuhao Lu et al, Ser. No. 14/668,788, filed Mar. 25, 2015, METHOD FOR THE SYNTHESIS OF IRON HEXACYANOFERRATE, invented by Sean Vail et al, Ser. No. 14/472,228, filed Aug. 28, 2014, TRANSITION METAL HEXACYANOMETALLATE ELECTRODE WITH WATER-SOLUBLE BINDER, invented by Long Wang et al, Ser. No. 14/340,141, filed Jul. 24, 2014, ELECTROLYTE ADDITIVES FOR TRANSITION METAL CYANOMETALLATE ELECTRODE STABILIZATION, invented by Yuhao Lu et al, Ser. No. 14/320,352, filed Jun. 30, 2014, RECHARGEABLE METAL-ION BATTERY WITH NON-AQUEOUS HYBRID ION ELECTROLYTE, invented by Long Wang et al, Ser. No. 14/271,498, filed May 7, 2014, REACTIVE SEPARATOR FOR A METAL-ION BATTERY, invented by Long Wang et al, Ser. No. 14/230,882, filed Mar. 31, 2014, NASICON-POLYMER ELECTROLYTE STRUCTURE, invented by Long Wang et al, Ser. No. 14/198,755, filed Mar. 6, 2014, BATTERY WITH AN ANODE PRELOADED WITH CONSUMABLE METALS, invented by Yuhao Lu et al, Ser. No. 14/198,702, filed Mar. 6, 2014, BATTERY ANODE WITH PRELOADED METALS, invented by Long Wang et al, Ser. No. 14/198,663, filed Mar. 6, 2014, METAL BATTERY ELECTRODE WITH PYROLYZED COATING, invented by Yuhao Lu et al, Ser. No. 14/193,782, filed Feb. 28, 2014, METAL HEXACYANOMETALLATE ELECTRODE WITH SHIELD STRUCTURE, invented by Yuhao Lu et al, Ser. No. 14/193,501, filed Feb. 28, 2014, CYANOMETALLATE CATHODE BATTERY AND METHOD FOR FABRICATION, invented by Yuhao Lu et al, Ser. No. 14/174,171, filed Feb. 6, 2014, SODIUM IRON(II)-HEXACYANOFERRATE(II) BATTERY ELECTRODE AND SYNTHESIS METHOD, invented by Yuhao Lu et al, Ser. No. 14/067,038, filed Oct. 30, 2013, TRANSITION METAL HEXACYANOMETALLATE-CONDUCTIVE POLYMER COMPOSITE, invented by Sean Vail et al., Ser. No. 14/059,599, filed Oct. 22, 2013, now U.S. Pat. No. 9,083,041, issued on Jul. 14, 2015;

METAL-DOPED TRANSITION METAL HEXACYANOFERRATE (TMHCF) BATTERY ELECTRODE, invented by Yuhao Lu et al., Ser. No. 13/907,892, filed Jun. 1, 2013, now U.S. Pat. No. 8,968,925, issued on Mar. 3, 2015;

HEXACYANOFERRATE BATTERY ELECTRODE MODIFIED WITH FERROCYANIDES OR FERRICYANIDES, invented by Yuhao Lu et al., Ser. No. 13/897,492, filed May 20, 2013, PROTECTED TRANSITION METAL HEXACYANOFERRATE BATTERY ELECTRODE, invented by Yuhao Lu et al., Ser. No. 13/872,673, filed Apr. 29, 2013, TRANSITION METAL HEXACYANOFERRATE BATTERY CATHODE WITH SINGLE PLATEAU CHARGE/DISCHARGE CURVE, invented by Yuhao Lu et al., Ser. No. 13/752,930, filed Jan. 29, 2013, SUPERCAPACITOR WITH HEXACYANOMETALLATE CATHODE, ACTIVATED CARBON ANODE, AND AQUEOUS ELECTROLYTE, invented by Yuhao Lu et al., Ser. No. 13/603,322, filed Sep. 4, 2012, IMPROVEMENT OF ELECTRON TRANSPORT IN HEXACYANOMETALLATE ELECTRODE FOR ELECTROCHEMICAL APPLICATIONS, invented by Yuhao Lu et al., Ser. No. 13/523,694, filed Jun. 14, 2012, ALKALI AND ALKALINE-EARTH ION BATTERIES WITH HEXACYANOMETALLATE CATHODE AND NON-METAL ANODE, invented by Yuhao Lu et al., Ser. No. 13/449,195, filed Apr. 17, 2012,

ELECTRODE FORMING PROCESS FOR METAL-ION BATTERY WITH HEXACYANOMETALLATE ELEC-

TRODE, invented by Yuhao Lu et al., Ser. No. 13/432,993, filed Mar. 28, 2012. All these applications are incorporated herein by reference.

FIG. 1 is a partial cross-sectional view of an alkali-ion battery cell with a transition metal cyanometallate (TMCM) sheet cathode and non-alkaline metal anode. The battery 100 comprises a cathode electrode 102 that in turn comprises a cathode current collector 104 and a cathode active material sheet 106 laminated to the cathode current collector. The current collector 104 may be aluminum, copper, or stainless steel, in the form of a foil, mesh, grid, or foam. The cathode active material sheet is formed from TMCM particles 108, conductive additives 110, and a polytetrafluoroethylene (PTFE) binder 112. Some examples of conductive additives include carbon black, carbon nanotubes (CNTs), and carbon nanofibers (CNFs). The TMCM particles 108 have the chemical formula $A_X M1_M M2_N(CN)_Z \cdot d[H_2O]_{ZEO} \cdot e[H_2O]_{BND}$:

where A is a metal from Group 1A and Group 2 of the Periodic Table;
where M1 is a metal selected from a group consisting of 2+ and 3+ valance positions;
where M2 is a metal selected from a group consisting of 2+ and 3+ valance positions;
where $[H_2O]_{ZEO}$ represents zeolitic water molecules;
where $[H_2O]_{BND}$ represents bound water molecules;
where X is in the range of 0.5 to 2;
where M is in the range of 0.5 to 1.5;
where N is in the range of 0.5 to 1.5;
where z is in the range of 5 to 6;
where d is 0; and,
where e is in the range of greater than 0 and less than 8.

Unlike the TMCM, hexacyanometallate or Prussian blue analogues reported in in the prior art, the zeolitic water has been eliminated in the TMCM disclosed herein. As such, these TMCMs can be used in non-aqueous (as well as aqueous) electrolyte batteries to achieve a stable performance. The zeolitic water existing in conventional PBAs, in contrast, is known to degrade the metal-ion batteries dramatically, as described in parent application entitled, PRUSSIAN BLUE ANALOGUE ELECTRODES WITHOUT ZEOLITIC WATER CONTENT, invented by Yuhao Lu et al., Ser. No. 14/830,838, filed Aug. 20, 2015 Some examples of the "A" metals (cations) include sodium (Na) and potassium (K). Although labeled as an alkali-ion battery, the "A" cations may alternatively include ammonium ($NH_4$), lithium (Li), rubidium (Rb), Cesium (Cs), calcium (Ca), strontium (Sr), barium (Ba), silver Ag, aluminum (Al), and magnesium (Mg). $M_1$ and $M_2$ may be the same or different metal ions, such as titanium (Ti), vanadium (V), chromium (Cr), manganese (Mn), iron (Fe), cobalt (Co), nickel (Ni), copper (Cu), zinc (Zn), Ca, and Mg.

The battery 100 further comprises a non-aqueous electrolyte 112 capable of conducting A cations, a non-alkaline metal anode electrode 114, and an ion-permeable membrane 116 separating the non-alkaline metal anode electrode from the cathode electrode 102. As explained in more detail below, the electrodes are layered-stacked or wound with high melting temperature ion-permeable membrane or separator 116, and dried at 100-300° C.

The cathode active material sheet 104 has a thickness 118 in the range of 100 microns to at least 2 millimeters (mm), although thicknesses as small as 200 nanometers (nm) and larger than 2 mm are equally possible. Note: the drawing is not to scale. The cathode electrode 102 comprises a ratio of cathode active material (i.e., TMCM 108) to all other components in the battery of greater than 35%. The ratio of active materials to all other components in a conventional battery with a coated TMCM cathode is less than 35%. Thick electrodes, resulting in the use of fewer cells reduces the percentage of battery occupied by the current collector and separator, which are non-active materials and contribute 20 wt. % in the a battery.

The non-alkaline metal anode electrode 114 comprises an anode current collector 120. The anode may be coated, as is conventional, but in one aspect as shown, an anode active material sheet 122 is laminated to the anode current collector formed with a PTFE binder 112. The non-alkaline metal anode electrode active material 124 may be comprised of hard carbon, tin (Sn), antimony (Sb), lead (Pb), NASICON-sodium titanium phosphate ($NaTi_2(PO_4)_3$), SnSb alloys, or combinations thereof. Note: NASICON-sodium titanium phosphate is an alkaline contained compound, not a metal. Although not shown, the anode may further comprise conductive additives. The anode active material sheet 122 has a thickness 126 in the range of 100 microns to 2 mm. Thicker cathode and anode electrodes increase the energy density of the battery and reduce the number of required cells, with their current collectors and separators (ion-permeable membranes). An electrode with an active material thickness of 1 mm saves 80%, by weight, of the usage of current collector and separator relative to coated electrode with a thickness of 100 micrometers.

In one aspect, the ion-permeable membrane 116 has a melting temperature of greater than 200 degrees C. The ion-permeable membrane 116 may be a material such as cellulose or nanofibrous polyimide silicon, composites made from combinations of alumina, zirconia, or silicon, or polymers including polyethylene, polypropylene, or polyethylene terephthalate.

Water or blends of water and ethanol, isopropanol, or acetone are used as the dispersive solvents during battery fabrication. The as-prepared wet TMCM precipitates can be used to prepare thick electrodes without further drying process, which reduces the manufacturing steps and energy cost for drying. The electrodes are layered-stacked or wound with a high melting temperature separator and dried at 100-300° C. The high melting temperature separator enables the battery cell to be assembled in a normal (ambient) atmosphere. In contrast, conventional coated electrodes must be dried prior to assembly.

Figure 2:
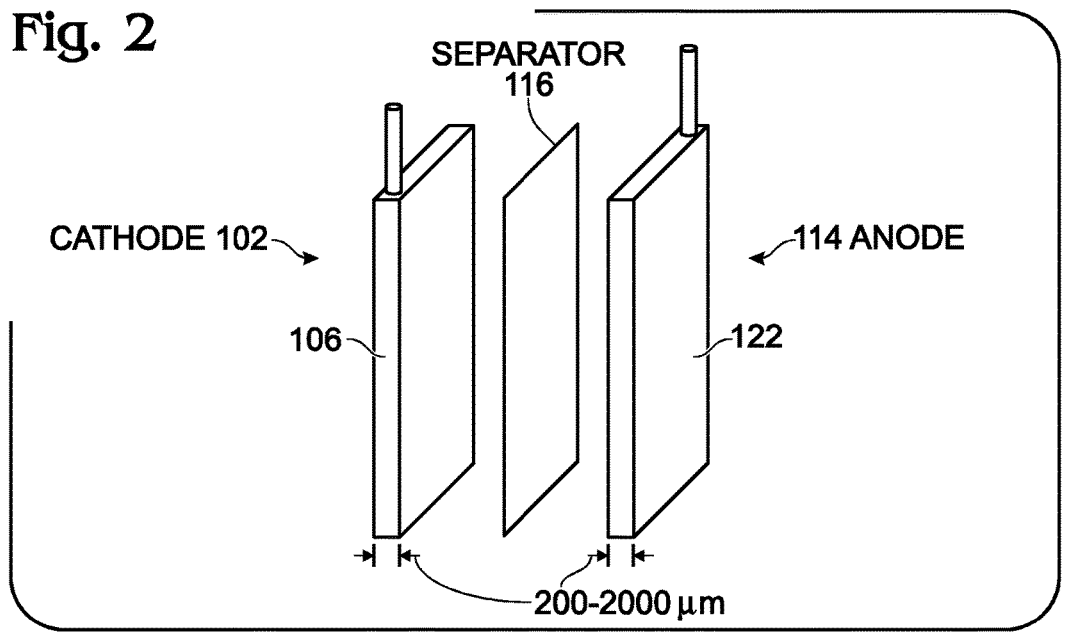
FIG. 2 is a perspective assembly drawing of the battery cell depicted in FIG. 1.

FIG. 2 is a perspective assembly drawing of the battery cell depicted in FIG. 1. In general, thick TMCM electrodes and nonmetallic anodes are fabricated by extruding and calendering the wet paste into rubber-like freestanding sheets. Calendering is a finishing process typically associated with cloth, paper, or plastic films, that uses a calender to smooth, coat, or thin a material. The wet paste for the cathode may be a mixture of TMCM, conductive carbon, fibrillatable polymer binder, and dispersive solvent. The wet paste for the anode may be a mixture of anode material, conductive carbon, fibrillatable polymer binder, and dispersive solvent. The electrode sheets obtained are then laminated onto current collectors. Sodium or potassium ion battery cells are assembled by stacking or winding the thick electrodes with a polyethylene, polypropylene, or high melting temperature separator.

EXPERIMENTAL RESULTS

Example 1

TMCM materials powder, conductive material additives, and PTFE binder were weighted and pre-mixed. The proportions of each component were: 70-97% for the TMCM materials, 0-10% for the conductive material additives, and 2-20% PTFE. Water, or blends of water and ethanol, isopropanol, or acetone were added into the above mixture to form a wet paste. The optimal range for the solvents added is 20-50%.

The wet paste was then pressed out or calendered into a free standing sheet or film with a desired thickness of 200-2000 μm by a stainless steel rolling press. This press and rolling was repeated until the material looked uniform and had a leathery or rubber-like texture. A hard carbon anode electrode sheet was produced via the same method as the TMCM electrodes with a desired thickness. Lamination results from a process that uses heat, pressure, or a combination of heat and pressure.

The thick TMCM and hard carbon electrode sheets or films were laminated onto aluminum current collectors to form the electrodes. The thick TMCM and hard carbon electrode electrodes were dried at 100-300° C. and layered-stacked or wound with porous polypropylene/polyethylene separators in a dry room or a glove box to form a sodium-ion battery cell. The porous polypropylene/polyethylene separators used in this example were purchased from Celgard.

Figure 3:
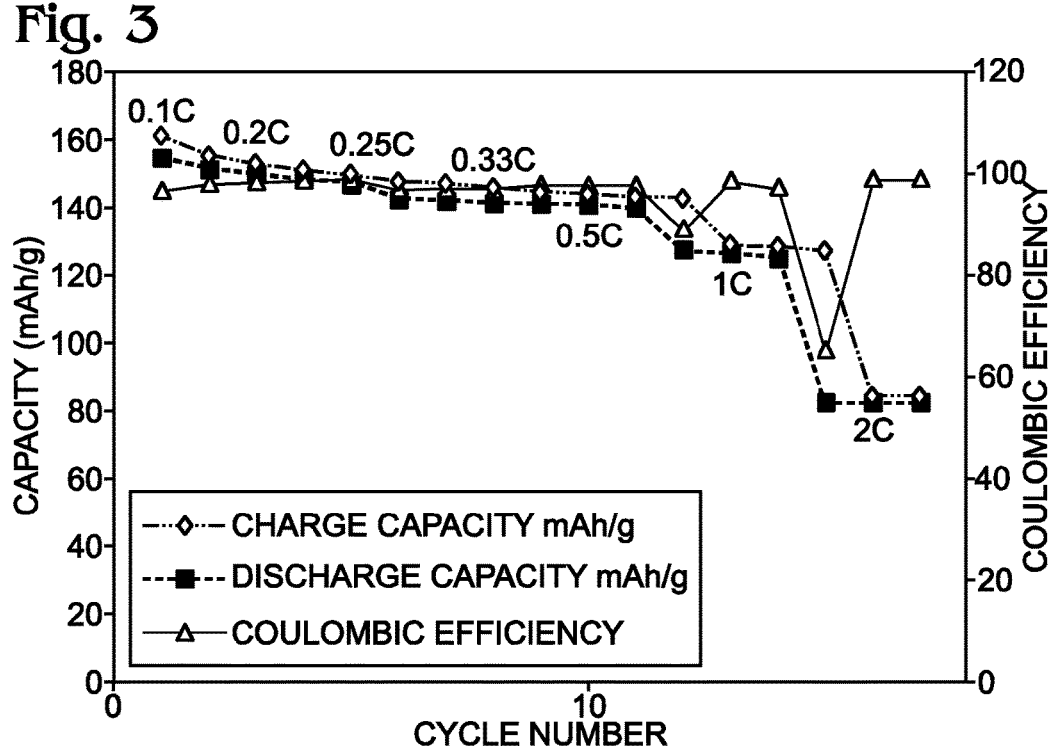
FIG. 3 is a graph depicting the rate performance of a TMCM electrode with a thickness of 0.47 mm.

FIG. 3 is a graph depicting the rate performance of a TMCM electrode with a thickness of 0.47 mm. A capacity of 125 milliamp hours per gram (mAh/g) was achieved at a 1 C rate.

Figure 4:
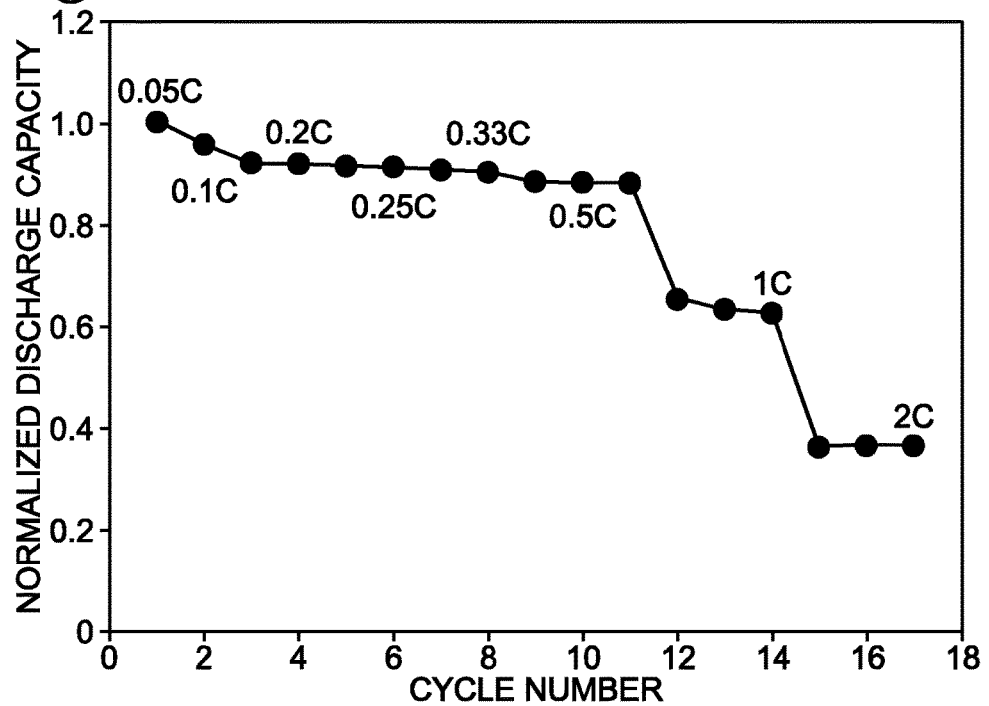
FIG. 4 is a graph depicting the capacity retention of a full cell with a thick TMCM electrode and a thick hard carbon electrode.

FIG. 4 is a graph depicting the capacity retention of a full cell with a thick TMCM electrode and a thick hard carbon electrode. A capacity retention of 85% at 0.5 C was realized.

Example 2

The preparation method of the TMCM and hard carbon electrodes was the same as in Example 1. The laminated TMCM electrodes were layered-stacked or wound with the hard carbon anode electrodes in normal (ambient) atmosphere to form a cell. A separator with a high transition temperature (greater than 200 degrees C.) was used in this example. The separator can be high melting temperature membrane such as a cellulose-based or nanofibrous polyimide membrane, or a composite membrane made from combinations of alumina, zirconia, and silicon along with numerous polymer components including polyethylene, polypropylene, and polyethylene terephthalate. The combination obtained was dried at 100-300° C. in vacuum before being transferred into a dry room or a glove box.

Example 3

The TMCM material wet precipitates, conductive material additives, and PTFE binder were weighted and pre-mixed. The proportions of each component were 70-97% for the TMCM materials (water in the wet precipitates was not included), 0-10% for the conductive material additives, and 2-20% o PTFE. Water or blends of water and ethanol, isopropanol, or acetone were added into the above mixture to form a wet paste. The optimal range for the solvents added is 20-50%.

The wet paste was then pressed out or calendered into a free standing sheet or film with a desired thickness of 200-2000 um by a stainless steel rolling press. This press and rolling was repeated until the material looked uniform and had a leathery or rubber-like texture.

The hard carbon electrode sheet was produced via the same method as of TMCM electrodes with a desired thickness. The thick TMCM and hard carbon electrode sheets or films were laminated onto current collectors to form the electrodes.

FIG. 5 is a flowchart illustrating a method for fabricating an alkali-ion battery with a TMCM sheet cathode and a non-alkaline metal anode. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 500.

Step 502 mixes TMCM powders, conductive additives, and a PTFE binder with a solution containing water, forming a wet paste. In one aspect, the solution includes a solvent such as ethanol, isopropanol, or acetone, forming a percentage of solvent in the solution in the range of 20 to 50%. The cathode active material comprises TMCM particles having a chemical formula $A_X M1_M M2_N(CN)_Z \cdot d[H_2O]_{ZEO} \cdot e[H_2O]_{BND}$, where A is a metal from Group 1A or Group 2 of the Periodic Table;

where M1 is a metal selected from a group consisting of 2+ and 3+ variance positions;

where M2 is a metal selected from a group consisting of 2+ and 3+ valance positions;

where $[H_2O]_{ZEO}$ represents zeolitic water molecules;

where $[H_2O]_{BND}$ represents bound water molecules;

where x is in the range of 0.5 to 2;

where M is in the range of 0.5 to 1.5;

where N is in the range of 0.5 to 1.5;

where z is in the range of 5 to 6;

where d is 0; and, where e is in the range of greater than 0 and less than 8.

Step 504 forms the wet paste into a free-standing sheet of cathode active material. As used herein, a "free-standing sheet" is defined as a sheet of material having sufficient structural integrity, even when wet, to stand on its edge without collapsing of losing its sheet-like form. Typically, the free-standing sheet of cathode active material has a thickness typically in the range of 100 microns to 2 mm, although it can also be formed as thin as 200 nm and greater than 2 mm. Step 506 laminates the sheet of cathode active material to a cathode current collector, forming a cathode electrode. Step 508 assembles the cathode electrode with a non-alkaline metal anode electrode and an ion-permeable membrane interposed between the cathode electrode and anode electrode, forming an assembly. The ion-permeable membrane may be a material such as cellulose or nanofibrous polyimide silicon, composites made from combinations of alumina, zirconia, or silicon, or polymers including polyethylene, polypropylene, and polyethylene terephthalate.

Step 510 dries the assembly at a temperature of greater than 100 degrees C. As noted above, the drying temperature may be as high as 300 degrees C. The step is enabled when the ion-permeable membrane has a melting temperature of greater than 200 degrees C. Step 512 inserts the dried assembly into a container (e.g., a battery pouch bag or can). Step 514 adds electrolyte to the container.

In one aspect, forming the free-standing sheet of cathode active material in Step 504 includes substeps. Step 504a either extrudes or calenders the wet paste, to form an initial product. Step 504b uses a rolling press to press the initial product to a predetermined thickness. These substeps may be repeated. The ratio of cathode active material to non-active materials may be greater than 35%.

In another aspect, Step 507a mixes anode active material powder and a PTFE binder with a water solution, forming a wet paste. Step 507b forms a free-standing anode active material sheet, and Step 507c laminates the anode active material sheet to an anode current collector, forming the anode electrode. The water solution used in Step 505a may additionally comprise a solvent in the range of 1 to 10 percentage by weight (wt. %), such as ethanol, isopropanol, or acetone. The non-alkaline metal anode electrode active material may be hard carbon, Sn, Sb, Pb, $NaTi_2(PO_4)_3$, SnSb alloys, or combinations thereof.

FIG. 6 is a flowchart illustrating a method for decreasing the size of an alkali-ion TMCM cathode battery. The method begins at Step 600. Step 602 provides a battery having a first capacity and first volumetric energy density, formed from a first plurality of cells. Each cell comprises a cathode including a current collector coated with TMCM active material having a thickness of x microns (e.g., a cathode formed by conventional coating means), a non-alkali metal anode, an ion permeable membrane between the anode and cathode, and an electrolyte. Typically, x is less than 100 microns. Step 604 replaces the first plurality of cells with a single cell comprising a current collector with a laminated TMCM film having a thickness of y microns, where y is greater than x. The single cell includes a non-alkali metal anode, an ion permeable membrane between the anode and cathode, and an electrolyte. In response to replacing the first plurality of cells with the single cell, Step 606 maintains the battery first capacity. In one aspect, Step 608 increases the battery volumetric energy density in response to replacing the first plurality of cells with the single cell, In another aspect, the single cell TMCM film includes a polytetrafluoroethylene (PTFE) binder. Further, the y thickness of the single cell TMCM active material is in the range of 100 microns to 2 mm. In one aspect, the single cell non-alkali metal anode includes a film laminated to an anode current collector, having a thickness of greater than 100 microns, and comprising a PTFE binder. In one aspect, the electrolyte of the single cell may be a non-aqueous electrolyte.

An alkali-ion battery with a TMCM sheet cathode and non-alkaline metal anode, as well as associated fabrication methods, have been provided. Examples of particular materials and process steps have been presented to illustrate the invention. However, the invention is not limited to merely these examples. Other variations and embodiments of the invention will occur to those skilled in the art.

We claim:

1. An alkali-ion battery with a transition metal cyanometallate (TMCM) sheet cathode and non-alkaline metal anode, the battery comprising:
   a cathode electrode comprising:
     a cathode current collector;
     a cathode active material sheet laminated to the cathode current collector formed from TMCM particles, conductive additives, and a polytetrafluoroethylene (PTFE) binder, the TMCM particles having a chemical formula $A_xM1_MM2_N(CN)_z \cdot d[H_2O]_{ZEO} \cdot e[H_2O]_{BND}$,
     where A is a metal from Group 1A or Group 2 of the Periodic Table;
     where M1 is a metal selected from the group consisting of 2+ and 3+ valance positions;
     where M2 is a metal selected from the group consisting of 2+ and 3+ valance positions;
     where $[H_2O]_{ZEO}$ represents zeolitic water molecules;
     where $[H_2O]_{BND}$ represents bound water molecules;
     where X is in a range of 0.5 to 2;
     where M is in a range of 0.5 to 1.5;
     where N is in a range of 0.5 to 1.5;
     where Z is in a range of 5 to 6;
     where d is 0;
     where e is in a range of greater than 0 and less than 8;
   a non-aqueous electrolyte capable of conducting A cations;
   the non-alkaline metal anode electrode; and,
   an ion-permeable membrane separating the non-alkaline metal anode electrode from the cathode electrode.

2. The battery of claim 1 wherein the cathode active material sheet has a thickness in a range of 100 microns to 2 millimeters (mm).

3. The battery of claim 1 wherein the non-alkaline metal anode electrode comprises an active material selected from the group consisting of hard carbon, tin (Sn), antimony (Sb), lead (Pb), NASICON-sodium titanium phosphate ($NaTi_2(PO_4)_3$), SnSb alloys, and combinations thereof.

4. The battery of claim 1 wherein the cathode electrode comprises a ratio of cathode active material to non-active materials of greater than 35%.

5. The battery of claim 1 wherein the non-alkaline metal anode electrode comprises:
   an anode current collector; and,
   an anode active material sheet laminated to the anode current collector formed with a PTFE binder.

6. The battery of claim 5 wherein the anode active material sheet has a thickness in a range of 100 microns to 2 mm.

7. The battery of claim 1 wherein the ion-permeable membrane has a melting temperature of greater than 200 degrees C.

8. The battery of claim 7 wherein the ion-permeable membrane is a material selected from the group consisting of cellulose or nanofibrous polyimide, composites made from combinations of alumina, zirconia, or silicon, and polymers including polyethylene, polypropylene, and polyethylene terephthalate.

9. A method decreasing the size of an alkali-ion transition metal cyanometallate (TMCM) cathode battery, the method comprising:
   providing a battery having a first capacity and first volumetric energy density, formed from a first plurality of cells, each cell comprising a cathode including a current collector coated with TMCM active material having a thickness of x microns, a non-alkali metal anode, an ion permeable membrane between the anode and cathode, and an electrolyte;
   replacing the first plurality of cells with a single cell comprising a current collector with a laminated TMCM film having a thickness of y microns, where y is greater than x, a non-alkali metal anode, an ion permeable membrane between the anode and cathode, and an electrolyte; and;
   in response to replacing the first plurality of cells with the single cell, maintaining the battery first capacity;
   wherein the TMCM active material comprises: TMCM particles having a chemical formula $A_xM1_MM2_N(CN)z \cdot d[H_2O]_{ZEO} \cdot e[H_2O]_{BND}$,
   where A is a metal from Group 1A or Group 2 of the Periodic Table;
   where M1 is a metal selected from the group consisting of 2+ and 3+ valance positions;

where M2 is a metal selected from the group consisting of 2+ and 3+ valance positions;
where $[H_2O]_{ZEO}$ represents zeolitic water molecules;
where $[H_2O]_{BND}$ represents bound water molecules;
where x is in a range of 0.5 to 2;
where M is in a range of 0.5 to 1.5;
where N is in a range of 0.5 to 1.5;
where z is in a range of 5 to 6;
where d is 0; and,
where e is in a range of greater than 0 and less than 8.

10. The method of claim 9 wherein the single cell TMCM film includes a polytetrafluoroethylene (PTFE) binder.

11. The method of claim 9 wherein the single cell non-alkali metal anode includes a film laminated to an anode current collector, has a thickness of greater than 100 microns, and comprises a PTFE binder.

12. The method of claim 9 further comprising:
increasing the battery volumetric energy density in response to replacing the first plurality of cells with the single cell.

13. The method of claim 9 wherein the single cell TMCM active material thickness of y is greater than 100 microns and less than 2 millimeters.

14. The method of claim 9 wherein the single cell electrolyte is a non-aqueous electrolyte.

15. A method for fabricating an alkali-ion battery with a transition metal cyanometallate (TMCM) sheet cathode and a non-alkaline metal anode, the method comprising:
assembling a TMCM cathode electrode with a non-alkaline metal anode electrode and an ion-permeable membrane interposed between the cathode electrode and anode electrode, forming an assembly;
drying the assembly at a temperature of greater than 100 degrees C.;
inserting the dried assembly into a container; and,
adding a non-aqueous electrolyte to the container wherein the TMCM cathode material comprises: TMCM particles having a chemical formula $A_xM1_MM2_N(CN)z \cdot d[H_2O]z_{ZEO} \cdot e[H_2O]_{BND}$,
where A is a metal from Group 1A or Group 2 of the Periodic Table;
where M1 is a metal selected from the group consisting of 2+ and 3+ valance positions;
where M2 is a metal selected from the group consisting of 2+ and 3+ valance positions;
where $[H_2O]_{ZEO}$ represents zeolitic water molecules;
where $[H_2O]_{BND}$ represents bound water molecules;
where x is in a range of 0.5 to 2;
where M is in a range of 0.5 to 1.5;
where N is in a range of 0.5 to 1.5;
where z is in a range of 5 to 6;
where d is 0; and,
where e is in a range of greater than 0 and less than 8.

16. The method of claim 15 wherein the non-alkaline metal anode electrode comprises an active material selected from the group consisting of hard carbon, tin (Sn), antimony (Sb), lead (Pb), NASICON-sodium titanium phosphate ($NaTi_2(PO_4)_3$), SnSb alloys, and combinations thereof.

17. The method of claim 15 wherein the ion-permeable membrane has a melting temperature of greater than 200 degrees C.

18. The method of claim 17 wherein the ion-permeable membrane is a material selected from the group consisting of cellulose or nanofibrous polyimide, composites made from combinations of alumina, zirconia, or silicon, and polymers including polyethylene, polypropylene, and polyethylene terephthalate.

\* \* \* \* \*